(12) United States Patent
Hoekstra et al.

(10) Patent No.: US 11,381,077 B2
(45) Date of Patent: Jul. 5, 2022

(54) SURGE PROTECTION CIRCUIT

(71) Applicant: GE Aviation Systems, LLC, Grand Rapids, MI (US)

(72) Inventors: Eric John Hoekstra, Holland, MI (US); Brian Michael Collins, Kentwood, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 204 days.

(21) Appl. No.: 16/577,300

(22) Filed: Sep. 20, 2019

(65) Prior Publication Data

US 2020/0112168 A1    Apr. 9, 2020

Related U.S. Application Data

(63) Continuation of application No. 15/243,526, filed on Aug. 22, 2016, now Pat. No. 10,431,974.

(51) Int. Cl.
*H02H 3/04* (2006.01)
*H02H 9/04* (2006.01)
*H02H 9/00* (2006.01)

(52) U.S. Cl.
CPC .............. *H02H 9/04* (2013.01); *H02H 3/044* (2013.01); *H02H 9/005* (2013.01); *H02H 9/042* (2013.01)

(58) Field of Classification Search
CPC ....... H02H 9/02–028; H02H 9/04–049; H02H 3/04; H02H 3/044; H02H 3/335; H02H 9/005; H01R 13/6666; H01C 7/12
USPC ...... 361/91.1, 91.2, 91.5, 91.6, 91.7, 40, 41, 361/56, 57, 111, 117
See application file for complete search history.

(56) References Cited

U.S. PATENT DOCUMENTS

| | | | |
|---|---|---|---|
| 4,849,845 A | 7/1989 | Schmitt | |
| 7,706,112 B2 | 4/2010 | Crawley et al. | |
| 10,431,974 B2 | 10/2019 | Hoekstra | |
| 2002/0171298 A1* | 11/2002 | Chen | H02H 11/002 307/127 |
| 2011/0188162 A1 | 8/2011 | Wetter et al. | |

(Continued)

FOREIGN PATENT DOCUMENTS

| | | |
|---|---|---|
| CN | 202524075 U | 11/2012 |
| DE | 20 2012 012 874 U1 | 2/2014 |
| EP | 2 701 256 A1 | 2/2014 |

OTHER PUBLICATIONS

Office Action issued in connection with corresponding CA Application No. 2975741 dated Jun. 26, 2018.

(Continued)

*Primary Examiner* — Thienvu V Tran
*Assistant Examiner* — Ivan Laboy
(74) *Attorney, Agent, or Firm* — Wood IP LLC

(57) ABSTRACT

A clamp circuit including a power dissipation circuit having at least one transistor and a resistor which dissipates power from the surge across the resistor and the transistor by turning on the at least one transistor and forming a voltage divider between a source impedance and the resistor thereof disposed in series with a channel of the transistor; and the resistor holding a portion of transient pulse seen by the load to a low voltage and adding of the low voltage to a threshold voltage of the transistor; and a sub-circuit which tests a functionality of the power dissipation circuit.

16 Claims, 7 Drawing Sheets

(56) References Cited

U.S. PATENT DOCUMENTS

| | | | |
|---|---|---|---|
| 2012/0187969 A1* | 7/2012 | Hess | H02H 9/042 |
| | | | 324/750.3 |
| 2013/0208380 A1* | 8/2013 | Hendricks | H02H 3/021 |
| | | | 361/56 |
| 2013/0229163 A1* | 9/2013 | Deng | H03K 17/082 |
| | | | 323/299 |
| 2014/0002100 A1* | 1/2014 | Feucht | H02H 9/043 |
| | | | 324/537 |
| 2014/0340799 A1 | 11/2014 | Gray | |
| 2015/0070950 A1* | 3/2015 | Myhre | H02M 7/217 |
| | | | 363/53 |

OTHER PUBLICATIONS

Extended European Search Report and Opinion issued in connection with corresponding EP Application No. 17186421.8 dated Jan. 18, 2018.

* cited by examiner

SURGE PROTECTION CIRCUIT

I. TECHNICAL FIELD

The present invention relates generally to circuit protection. In particular, the present invention relates to providing enhanced transient protection circuits.

II. BACKGROUND

Lightning protection for avionics systems is typically provided by protection circuits that use transorbs or similar clamping devices. These protection circuits are typically designed to dissipate large amounts of energy but often at the expense of device precision. For example, the operating voltage of most transorbs vary significantly from part to part, as well as with operating current and temperature. Therefore, fitting these protection circuits in avionics systems is technologically challenging and economically prohibitive because the protection circuits must be custom-designed for each system due to the variability in component characteristics and performance.

Furthermore, transorbs cannot be readily tested once they are embedded and in use in a lightning protection circuit. Consequently, a load coupled to the circuit may remain unprotected, because it is not possible to know whether a transorb has failed. Stated otherwise and more generally, in typical lightning protection circuits that use transorbs, it is challenging to ascertain whether a load is actually being protected because it is difficult to determine whether the transorbs are operational when the circuits are powered on.

III. SUMMARY OF THE EMBODIMENTS

The embodiments featured herein help solve or mitigate the above noted issues as well as other issues known in the art. For example, by taking advantage of newly improved transistor devices using silicon, silicon carbide, or gallium nitride semiconductors, some of the embodiments provide transient protection circuits that have precise operational characteristics as well as built-in test functions for determining whether the surge protection elements of the circuits are operational.

More specifically, some embodiments provide transient lightning protection circuits having clamping voltages that are more tightly controlled because they include signal level voltage-sensitive elements that have improved component characteristics and performance with respect to typical transorbs. Moreover, some of the embodiments provide the capability to continually or periodically assess the functionality of a protection circuit.

Under certain circumstances, an embodiment provides a clamp circuit for protecting a load against a surge voltage. The clamp circuit includes a power dissipation circuit that includes at least one transistor and a resistor. The clamp circuit further includes a voltage sensitive device configured to turn the at least one transistor on when a surge occurs. The power dissipation circuit is thus configurable to turn on the transistor to dissipate power from the surge across one of the resistor and the at least one transistor.

Another embodiment provides a clamp circuit for protecting a load against a surge. The clamp circuit includes a power dissipation circuit that includes at least one transistor and a resistor. The power dissipation circuit is configurable to dissipate power from the surge by turning on the at least one transistor. The clamp circuit further includes a sub-circuit configured to test a functionality of the power dissipation circuit.

Additional features, modes of operations, advantages, and other aspects of various embodiments are described below with reference to the accompanying drawings. It is noted that the present disclosure is not limited to the specific embodiments described herein. These embodiments are presented for illustrative purposes, and additional embodiments, or modifications of the embodiments disclosed, will be readily apparent to persons skilled in the relevant art(s) based on the teachings provided.

IV. DESCRIPTION OF WINGS

The illustrative embodiments may take form in various components and arrangements of components. The illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION OF THE EMBODIMENTS

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1A:
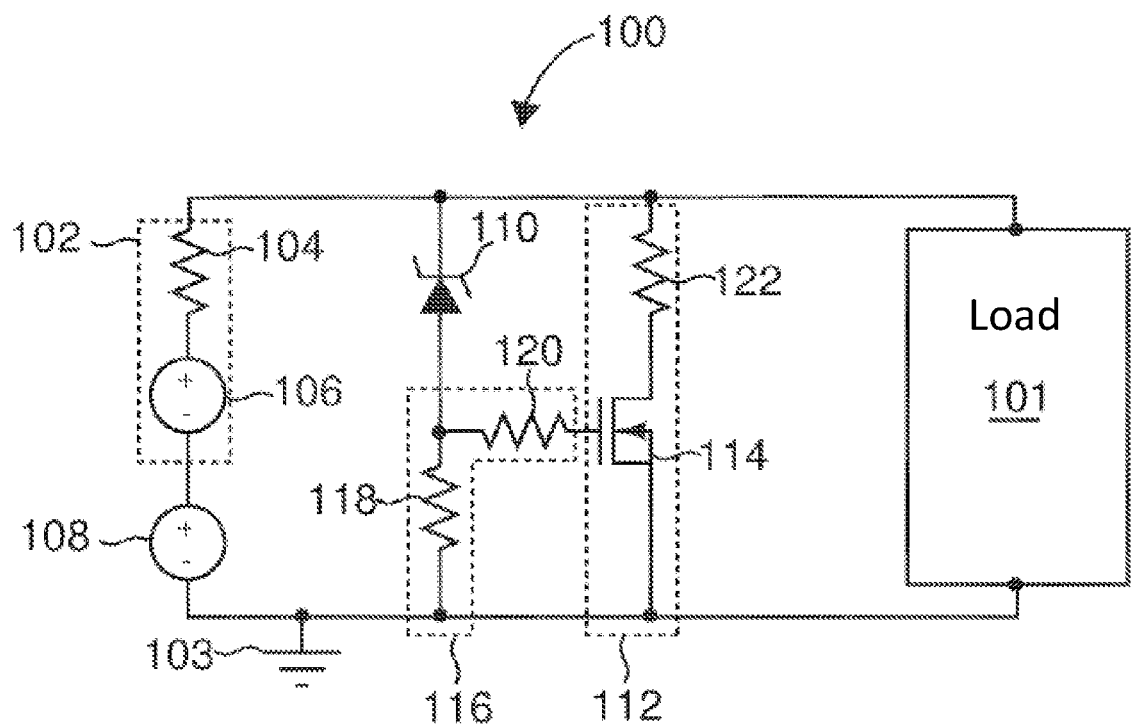
FIG. 1A illustrates an exemplary clamp circuit in accordance with various aspects described herein.

FIG. 1A illustrates a clamp circuit 100 according to an embodiment. The clamp circuit 100 is configured to protect a load 101 against a current and/or voltage surge, which can be caused by lightning, for example. The load 101 can be, by example and not by limitation, an avionic system such as a flight control system, a flight recorder, a landing gear control system, and/or communications hardware. One of ordinary skill in the art will readily understand that the clamp circuit 100 can be used with loads other than the ones mentioned above and in applications other than avionics.

To better describe the operation of the clamp circuit 100, a surge is modeled in FIG. 1A using a surge equivalent circuit 102 that includes a resistor 104 and a voltage source 106; the resistor 104 is used to model the impedance of the voltage source 106. When the surge is due to lightning, the voltage source 106 can output a transient pulse having an amplitude of 600 V, and the pulse can last between about 5 and about 10 microseconds. Moreover, the resistor 104 can be a 2Ω resistor. Other surge events can be modeled using the equivalent circuit 102 by changing the pulse's duration and amplitude, as well as the impedance of the voltage source 106 (i.e. the resistor 104), without departing from the scope of the present disclosure.

The clamp circuit 100 further includes a voltage source 108 that delivers power across the load 101. In the absence of a surge (i.e. when the voltage source 106 has zero amplitude and the resistor 104 is zero Ω), the load 101 is connected across the positive terminal of the voltage source 108 and a ground terminal 103. In one embodiment, the voltage source 108 can be a constant voltage source that outputs 28 V while delivering the required current drawn by the load 101.

The clamp circuit 100 further includes a voltage sensitive device, namely a diode 110 that is reverse-biased and connected at its anode to a biasing circuit 116 of a power dissipation circuit 112. The diode 110 can be a Zener diode. In some embodiments of the clamp circuit 100, as well as in alternate embodiments of the exemplary clamp circuits described hereinafter, the voltage sensitive device can be a metal oxide varistor (MOV) rather than a Zener diode. These embodiments are advantageous when the transistor 114 is implemented using a bipolar transistor or is substituted for a Darlington pair; the MOV can provide improved performance because its relatively higher power density can be leveraged for accommodating the higher drive currents required by the bipolar transistor or the Darlington pair.

When a surge occurs, a transient pulse having the characteristics described above is superimposed on the output voltage of the voltage source 108, causing the diode 110 to avalanche. The avalanche current flows to the biasing circuit 116 and activates the power dissipation circuit 112. Activation occurs by developing a turn on voltage, for the transistor 114 (e.g. a MOSFET), through a voltage divider formed by a resistor 118 and 120 within the biasing circuit 116.

As the transistor 114 turns on, a voltage divider is formed between the pulse's source impedance (i.e. the resistor 104) and a resistor 122 disposed in series with the channel of the transistor 114. As such, the resistor 122 serves as a dump resistor that holds the portion of the transient pulse seen by the load 101 to a low voltage. Specifically, because the transistor 114 acts in conjunction with the diode 110 and the biasing circuit 116, the voltage applied to the load 101 during the surge is held to the Zener diode voltage, added to a threshold voltage of the transistor 114. In some embodiments, the Zener diode voltage of the diode 110 can be about 51 V and the threshold voltage of the transistor 114 can be about 3 V. Thus, during a surge, the voltage across the load 101 is limited, i.e. clamped, to about 54 V. The power of the surge is thus dissipated substantially in the resistor 122. In some embodiments, the resistor 122 can be a metal element resistor.

Figure 1B:
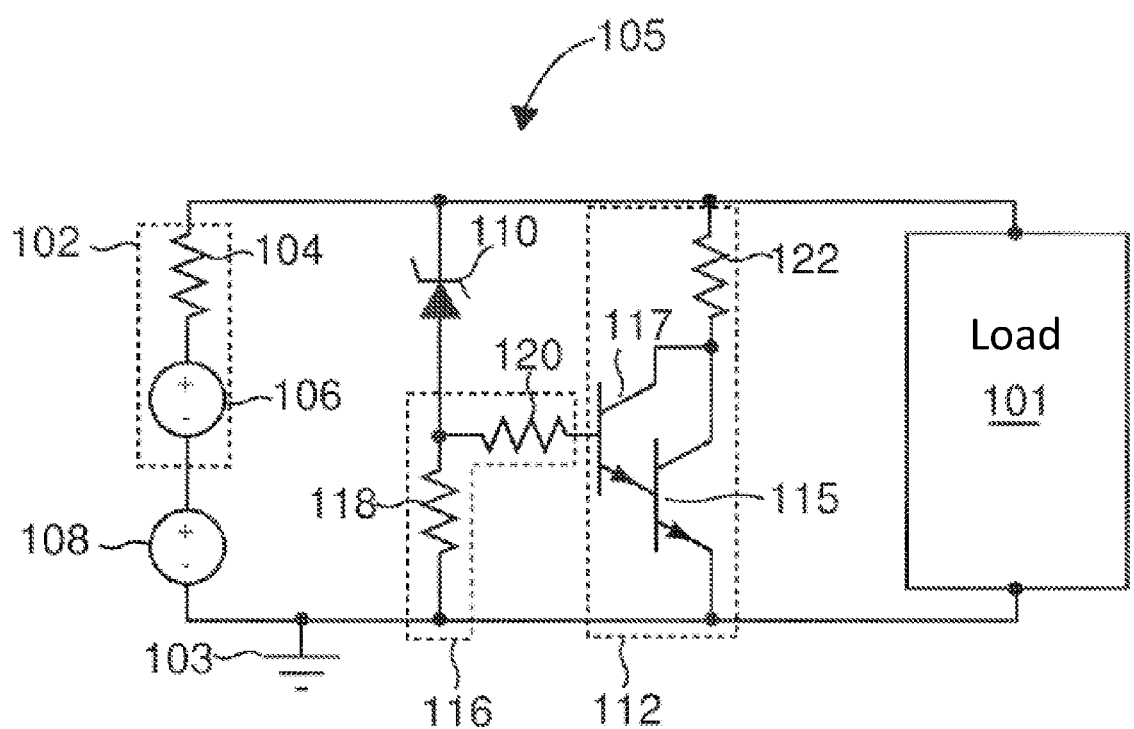
FIG. 1B illustrates an exemplary clamp circuit in accordance with various aspects described herein.

In alternate embodiments, the power dissipation circuit can be implemented using other types of transistors. For example, as shown in FIG. 1B, a clamp circuit 105 can be configured similarly to the clamp circuit 100, but with a power dissipation circuit that uses a Darlington pair formed by the bipolar junction transistors 115 and 117, instead of a MOSFET. The Darlington pair can provide more current drive than the MOSFET used in the clamp circuit 100, thus allowing the clamp circuit 105 to withstand higher surge currents.

Figure 2:
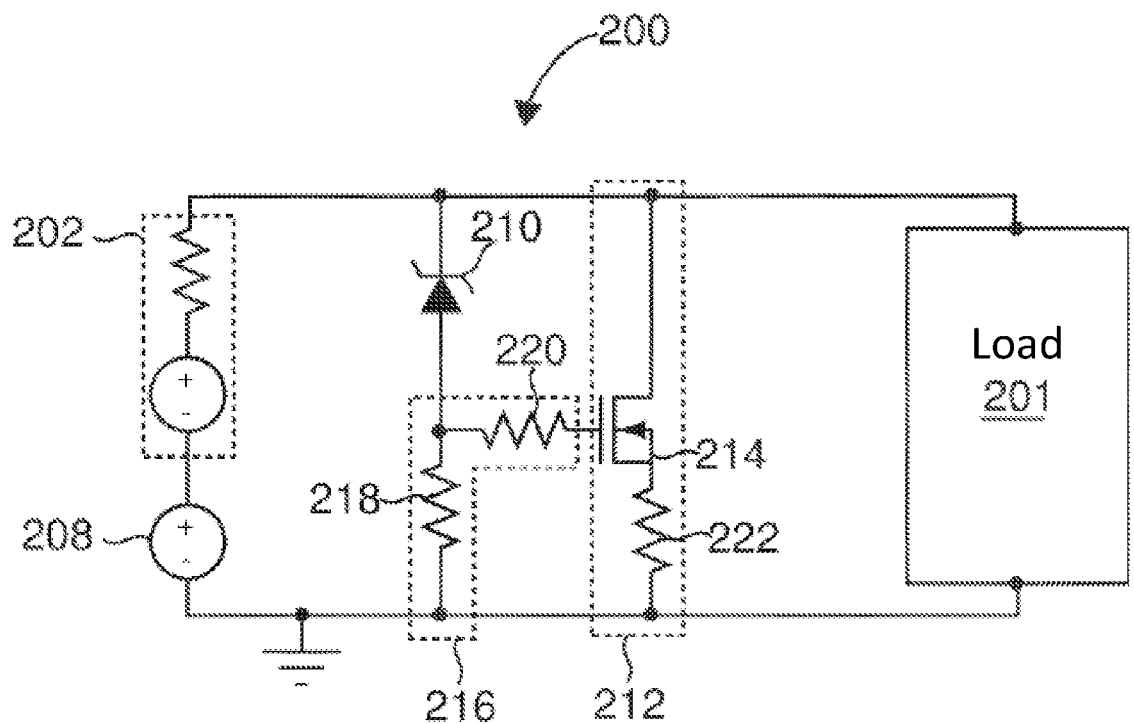
FIG. 2 illustrates an exemplary clamp circuit in accordance with various aspects described herein.

FIG. 2 illustrates a clamp circuit 200, according to another embodiment. In the clamp circuit 200, a surge can be modeled using a surge equivalent circuit 202 similar to the equivalent circuit 102 shown in FIG. 1A. The clamp circuit 200 includes a voltage source 208 that delivers power across a load 201. The clamp circuit 200 further includes a diode 210, which is reverse-biased and connected at its anode to a biasing circuit 216 of a power dissipation circuit 212.

The diode 210 can be a Zener diode. When the surge occurs, a transient pulse is superimposed on the output voltage of the voltage source 208, causing the diode 210 to avalanche. The avalanche current flows to the biasing circuit 216 and activates the power dissipation circuit 212. Activation occurs by developing a turn on voltage for a transistor 214 (e.g. a MOSFET) through a voltage divider formed by a resistor 218 and 220 within the biasing circuit 216.

When the transistor 214 turns on, a voltage divider is formed between the pulse's source impedance (i.e. the resistor 204) and the channel of the transistor 214. As such, the transistor 214 can serve as a dump load that holds the portion of the transient pulse seen by the load 201 to a low voltage. That is, in the clamp circuit 200, the power of the surge is dissipated in transistor 214. This process acts in conjunction with the diode 210 and the biasing circuit 216 to limit the voltage applied to the load 201 during the surge. Specifically, the voltage across the load 201 is limited to the Zener diode voltage, added to a threshold voltage of the transistor 214. The Zener diode voltage of the diode 210 can be about 51 V, and the threshold voltage of the transistor 214 can be about 3 V. Thus, during a surge, the voltage across the load 201 is clamped to about 54 V.

In the clamp circuit 200, more of the surge pulse's energy or power is dissipated substantially in the transistor 214 rather than in the resistor 222. When the diode 210 avalanches and the transistor 214 turns on, the voltage drop across the resistor 222 increases to hold the gate-to-source voltage ($V_{GS}$) of the transistor 214 at the threshold voltage of the transistor 214. Since the resistor 222 only has a voltage equal to $V_{GS}$ developed across it, it dissipates substantially less power than the resistor 122 of the clamp circuit 100.

Accordingly, nearly all the energy of the surge is dissipated in the transistor 214. The clamp circuit 200 is advantageous for embodiments where the transistor 214 is implemented in semiconductor transistor technologies such as silicon carbide (SiC) and gallium nitride (GaN), which inherently provide higher temperature performance than silicon transistor technologies.

Specifically, when either a SiC or a GaN transistor is used, the transistor 214 itself can be made to be the power dissipation element because it can inherently withstand higher temperatures caused by the power dissipation. Moreover, SiC and GaN technologies provide transistors having faster switching times, which means that the clamp circuit 200 is advantageous for accommodating surge pulses that have a short duration. In addition, the clamp circuit 200 can have a sharp turn-on due the inherent fast switching times afforded by SiC or GaN transistors.

Figure 3A:
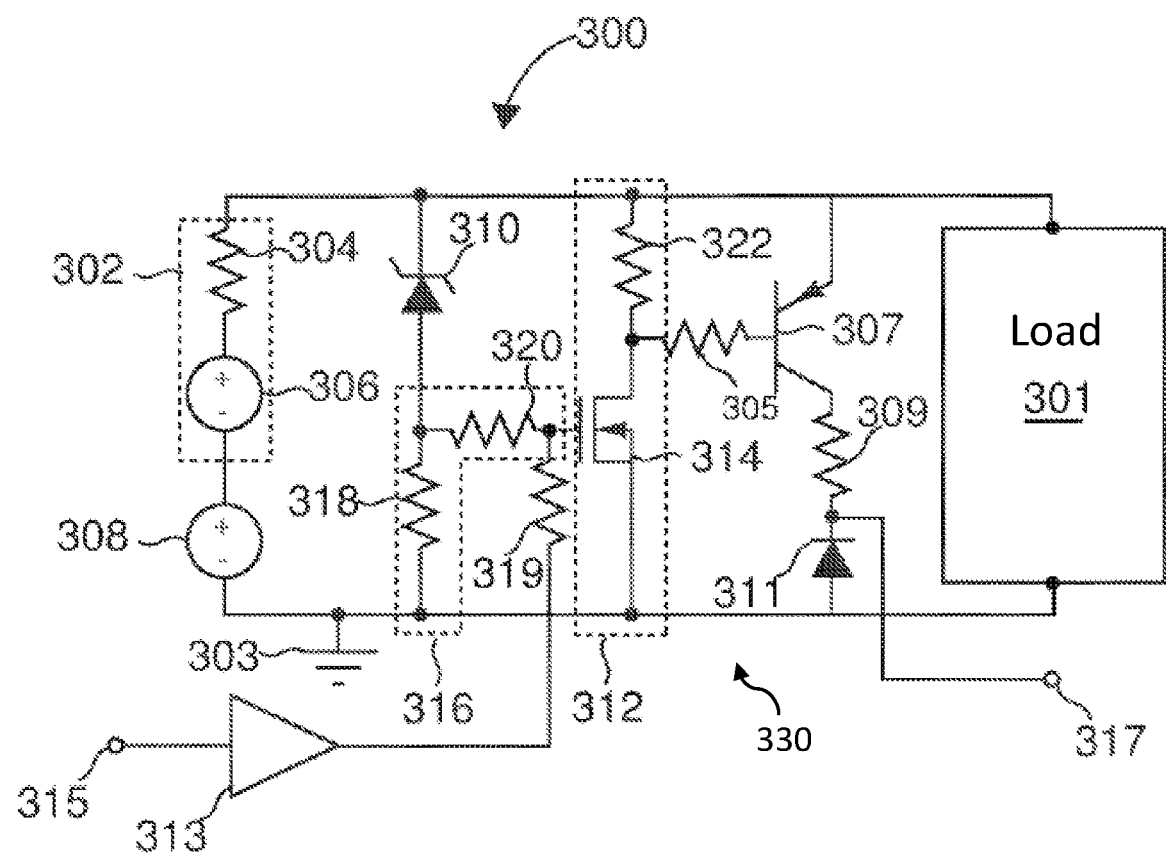
FIG. 3A illustrates an exemplary clamp circuit in accordance with various aspects described herein.

FIG. 3A illustrates a clamp circuit 300, according to another embodiment. The clamp circuit 300 includes hardware configured for performing a built-in test (BIT) function, as shall be described in greater detail below. In the clamp circuit 300, a surge is modeled using a surge equivalent circuit 302 similar to the equivalent circuits 102 and 202, shown in FIGS. 1A, 1B, and 2. The surge equivalent circuit 302 includes a voltage source 306 and a resistor 304.

The clamp circuit 300 includes a voltage source 308 that delivers power across a load 301. The clamp circuit 300 further includes a diode 310, which is reverse-biased and connected at its anode to a biasing circuit 316 of a power dissipation circuit 312. The diode 310 can be a Zener diode. When the surge occurs, a transient pulse is superimposed on the output voltage of the voltage source 308, causing the diode 310 to avalanche. The avalanche current flows to the biasing circuit 316 and turns on the power dissipation circuit 312 by developing a turn on voltage for a transistor 314 (e.g. a MOSFET) through a voltage divider formed by a resistor 318 and 320 included in the biasing circuit 316.

When the transistor 314 turns on, a voltage divider is formed between the pulse's source impedance (i.e. the resistor 304) and a resistor 322 disposed in series with the channel of the transistor 314. As such, the resistor 322 serves as a dump resistor holding the portion of the transient pulse seen by the load 301 to a low voltage. Because the transistor 314 acts in conjunction with the diode 310 and the biasing circuit 316, the voltage applied to the load 301 during the surge is held to the Zener diode voltage, added to a threshold voltage of the transistor 314.

In some embodiments, the Zener diode voltage of the diode 310 can be about 51 V and the threshold voltage of the transistor 314 can be about 3 V, which means that during a surge, the voltage across the load 301 is clamped to about 54 V. The power of the surge is thus dissipated in the resistor 322.

The clamp circuit 300 further includes hardware configured for performing a BIT function, i.e. a self-test function capable of indicating whether or not the clamp circuit 300 is defective. Generally, the BIT function can test a functionality of the power dissipation circuit 312 of the clamp circuit 300.

For example, depending on a surge's magnitude and/or on the frequency of surges, components of the power dissipation circuit 312 can be damaged, and the clamp circuit 300 can cease to protect the load 301 against subsequent surges. As such, the BIT function provides the capability to assess whether the clamp circuit 300 is still functional. In an avionics setting, the BIT function can be performed at power up of one or more systems connected to the clamp circuit 300.

The BIT function of the clamp circuit 300 can be performed by a sub-circuit 330 of the clamp circuit 300. The sub-circuit 330 can be implemented in the previously described clamp circuits 100 and 200 with a minimal increase in circuitry. Specifically, the sub-circuit 330 includes a resistor 305, a transistor 307, a resistor 309, a resistor 319, a diode 311, and a driver 313.

The sub-circuit 330 applies a test pulse to the gate of the transistor 314. The test pulse can be issued by a controller (not shown) at an input terminal 315 of the sub-circuit 330. The test pulse is buffered by the driver 313 and applied to the gate of the transistor 314 via the resistor 319. The transistor 307, the resistor 305, the resistor 309, and the diode 311 serve as a readout circuit that is configured to output a BIT response signal at an output terminal 317 of the sub-circuit 330.

When the clamp circuit 300 is functional, i.e. when the power dissipation circuit 312 is functional, the BIT response signal is asserted as a replica of the test pulse signal inputted on the input terminal 315. However, when the clamp circuit 300 is not functional, i.e. when one or more components of the power dissipation circuit 312 is damaged, the BIT response signal is held at close to zero (or the ground 303). In other words, the BIT response signal at the output terminal 317 does not track the input test signal.

Figure 3B:
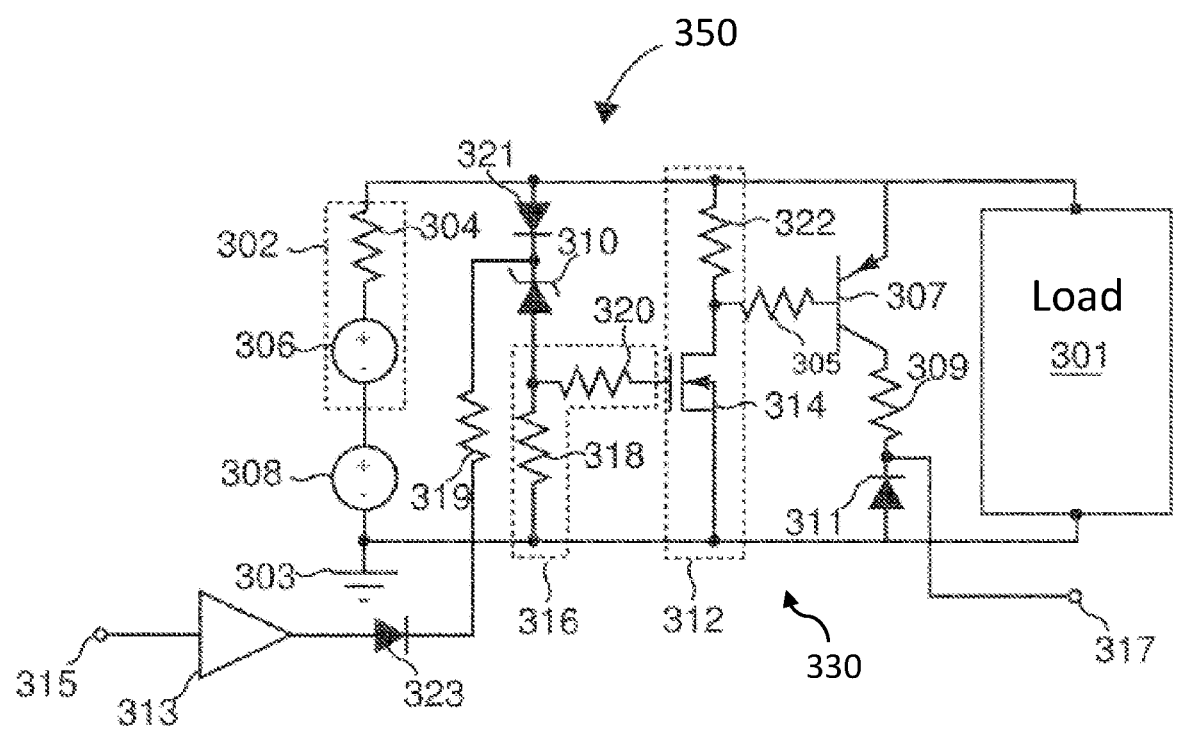
FIG. 3B illustrates an exemplary clamp circuit in accordance with various aspects described herein.

One of skill in the art will readily understand that the BIT function described above can be implemented with configurations other than the one shown in FIG. 3A. For example, in an alternate configuration, the BIT function can be implemented by asserting a test pulse at the cathode of the diode 310, as shown in FIG. 3B with respect to the clamp circuit 305.

As in the clamp circuit 300, in the clamp circuit 350, the test pulse can be issued by a controller (not shown) at the input terminal 315. The test pulse is buffered by the driver 313 and applied to at the cathode of the diode 310 via a path that includes the resistor 319, a diode 323, and a diode 321. The driver 313 applies a low current pulse at the cathode of the diode 310 to create a voltage greater than the Zener voltage to the diode 310, which initiates the test. The transistor 307, the resistor 305, the resistor 309, and the diode 311 serve as a readout circuit configured to output a BIT response signal at the output terminal 317.

The clamp circuit 305 can provide increased reliability in comparison with the clamp circuit 300. Specifically, because the test pulse propagates through more components of the circuit, there is a greater test coverage and more components can be tested.

Figure 4:
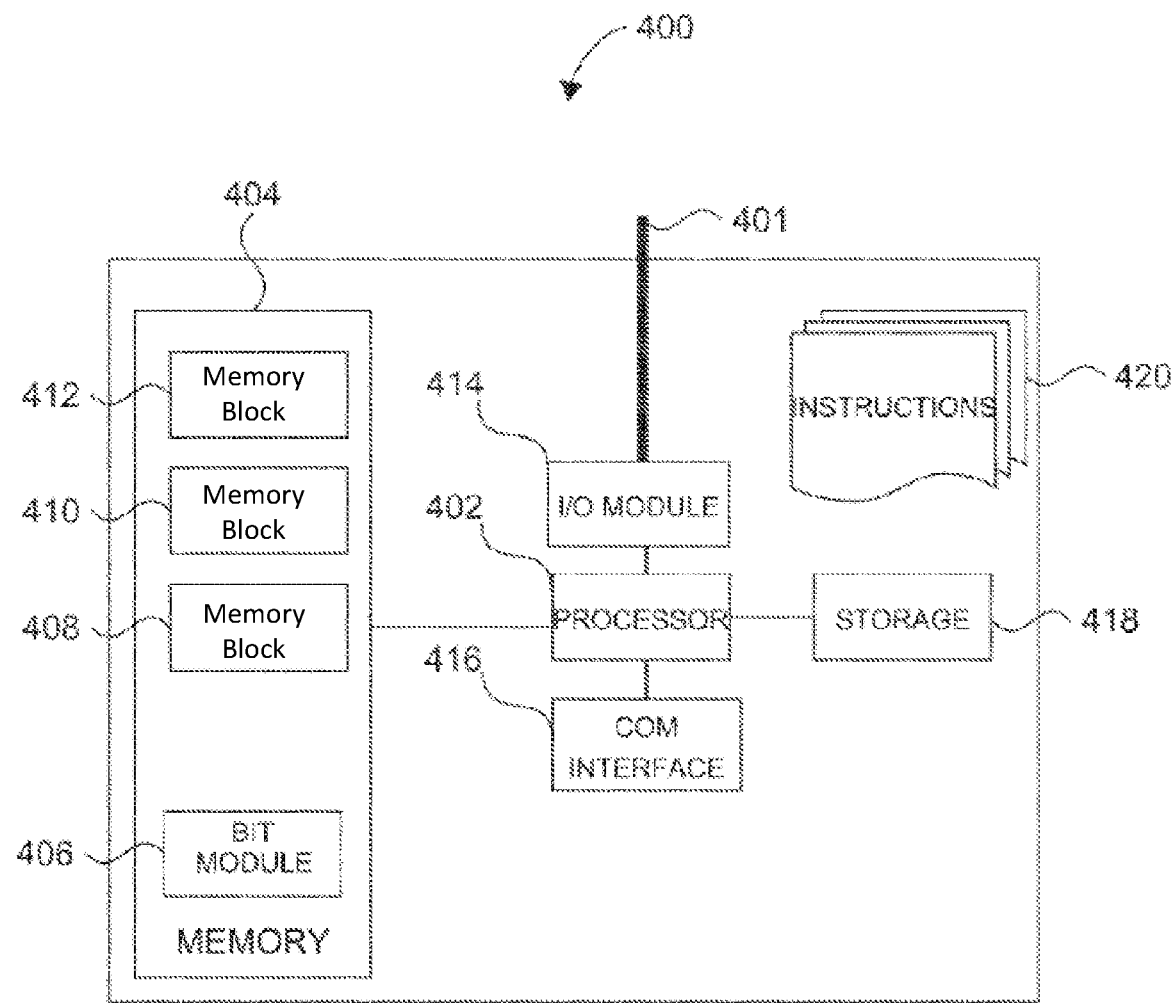
FIG. 4 illustrates an exemplary system in accordance with various aspects described herein.

FIG. 4 illustrates a controller 400 (or a control system) for use in conjunction with the clamp circuit 300, or with the clamp circuits 100 and 200 suitably modified to include a BIT function. The controller 400 can interface with the clamp circuit 300 via a bi-directional bus 401 coupled to the input terminal 315 and to the output terminal 317, and to at least one other node of the clamp circuit 300 from which the controller 400 can monitor current or voltage. Specifically, the controller 400 can be programmed to assert the BIT function test pulse and to receive the BIT function response signal.

The controller 400 can include a processor 402 that has a specific structure. The specific structure can be imparted to the processor 402 by instructions stored in a memory 404 included therein and/or by instructions 420 that can be fetched by processor 402 from a storage medium 418. The storage medium 418 may be co-located with the controller 400 as shown, or it may be located elsewhere and be communicatively coupled to controller 400.

The controller 400 can be a stand-alone programmable system, or it can be a programmable module located in a much larger system. For example, the controller 400 can be part of an embedded-computer system configured to control and/or monitor one or more avionics systems included in an aircraft. The controller 400 may include one or more hardware and/or software components configured to fetch, decode, execute, store, analyze, distribute, evaluate, and/or categorize information. Furthermore, the controller 400 can include an input/output (I/O) module 414 that can be configured to interface with a one or more clamp circuits like the clamp circuit 300 via a bi-directional bus 401.

The processor 402 may include one or more processing devices or cores (not shown). In some embodiments, the processor 402 may be a plurality of processors, each having either one or more cores. The processor 402 can be configured to execute instructions fetched from the memory 404, i.e. from one of memory blocks 412, 410, 408, or 406, or the instructions may be fetched from the storage medium 418, or from a remote device connected to the controller 400 via a communication interface 416.

Furthermore, without loss of generality, the storage medium 418 and/or memory 404 may include a volatile or non-volatile, magnetic, semiconductor, tape, optical, removable, non-removable, read-only, random-access, or any type of non-transitory computer-readable computer medium. The storage medium 418 and/or the memory 404 may include programs and/or other information that may be used by the processor 402. Furthermore, the storage medium 418 may be configured to log data processed, recorded, or collected during the operation of controller 400. The data may be time-stamped, location-stamped, cataloged, indexed, or organized in a variety of ways consistent with data storage practice.

In one embodiment, for example, the memory block 406 may be a BIT module, and it may include instructions that, when executed by the processor 402, cause the processor 402 to perform certain operations. The operations can include receiving a signal indicating that a clamp circuit connected to the controller 400 has been powered up. Receiving such a signal can be performed by monitoring a status of the clamp circuit via the bus 401. Power up can include, for example, switching on the voltage source 308 in the clamp circuit 300 to deliver power across the load 301. Upon receiving the confirmation of power up, the controller 400 can initiate a built-in-test (BIT) sequence.

The BIT sequence can include asserting a test pulse signal on the input terminal of the BIT function sub-circuit of the clamp circuit. The BIT sequence can include receiving a BIT function response signal from the output terminal of the BIT function sub-circuit. The BIT sequence can further include classifying the BIT response signal to indicate whether or not the clamp circuit is functional. For example, classification can include comparing the BIT response signal with the BIT test signal and indicating based on the comparison whether the BIT function of the clamp circuit is operational.

In one example, the controller 400 can indicate that the BIT function of the clamp circuit is not damaged when a digital "1" is obtained from performing a logical "AND" operation between the BIT test signal and the BIT response signal and that the clamp circuit is damaged when the operation yields a digital "0." Other classifying means that are readily evident to one of skill in the art can also be used, without departing from the scope of the present disclosure.

Figure 5:
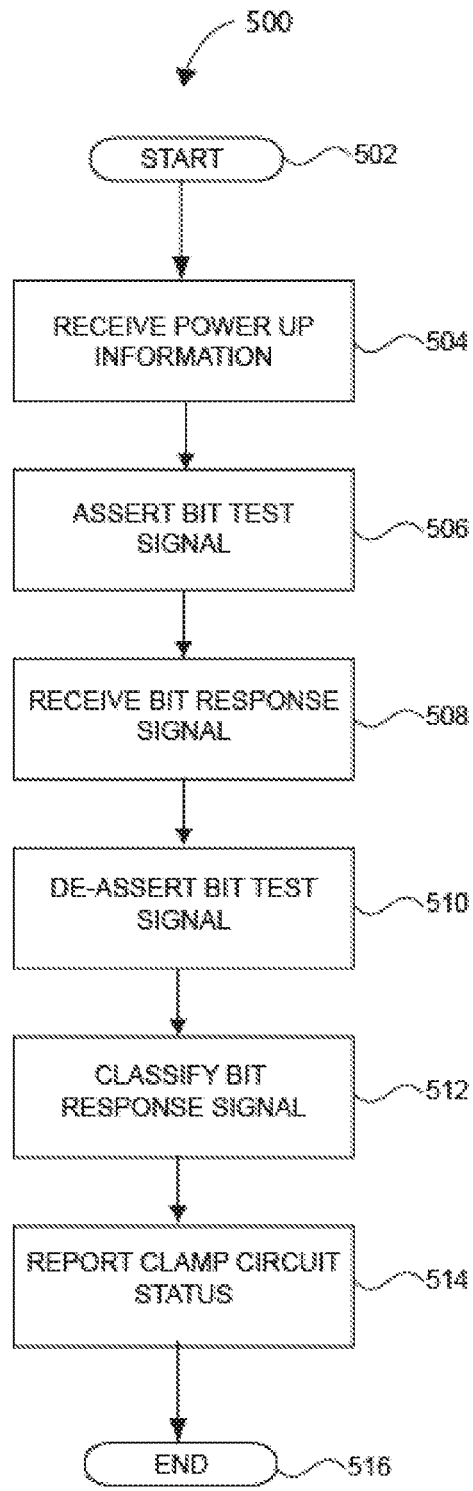
FIG. 5 illustrates a flow chart of an exemplary method in accordance with various aspects described herein.

Having set forth various exemplary embodiments, a method 500 consistent with their operation is now described with respect to FIG. 5. The method 500 can be executed by a controller like the controller 400, and it can begin at a block 502 in FIG. 5. At block 504, the method 500 can include receiving power up information from a clamp circuit coupled to the controller 400. The power up information can be a signal that indicates when (or whether or not) power has been turned on across a load connected to the clamp circuit.

Upon receiving the power up information, at block 506, and in response to power having been turned on across the load, the method 500 can include asserting a BIT test signal at an input terminal of a BIT function sub-circuit of the clamp circuit. For example and not by limitation, the BIT test signal can be a digital pulse. The method 500 can then include receiving a BIT response signal (at block 508) in response to the BIT test signal having been asserted. The BIT response signal can be received by the controller 400 from an output terminal of the clamp circuit.

Once the BIT response signal is received, the method 500 can include de-asserting the BIT test signal (block 510) and classifying the BIT response signal (block 512). Classification can be performed in order to determine whether the clamp circuit is functional, i.e. whether it can protect the load from an eventual surge. Upon classification, the method 500 can include reporting the result of the classification to indicate whether the clamp circuit is functional (block 514), at which point, if the clamp circuit is reported as being not functional, remedial action can be taken. The method 500 can then end at block 516.

While the embodiments have been described in the context of avionics and avionics systems, one of skill in the art will readily recognize that the embodiments generally apply to applications in which protection against surges is required. For example, the embodiments can be used to protect telecommunications or RF broadcasting equipment. Moreover, the method 500 can be used to periodically or continually check whether a clamp circuit is functional and is not limited to checking functionality solely at power up. Furthermore, with respect to the exemplary clamp circuits shown, one of ordinary skill in the art will readily appreciate that other arrangements of components and/or other types of components can be used without departing from the scope of the present disclosure. For example, either p or n MOSFETS can be used or either n-p-n or p-n-p bipolar transistors can be used. Moreover, instead of MOSFETs, IGBTS or power MOSFETS can be used to implement the clamp circuits and systems described herein.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A clamp circuit for protecting a load against a surge, the clamp circuit comprising:
    a power dissipation circuit including at least one transistor and a resistor, wherein the power dissipation circuit is configured to dissipate power from the surge across one of the resistor and the at least one transistor by turning on the at least one transistor, wherein when the at least one transistor is turned on, a voltage divider is formed between a source impedance and the resistor of the power dissipation circuit disposed in series with a channel of the at least one transistor and the resistor holds a portion of transient pulse seen by the load to a low voltage and the low voltage is added to a threshold voltage of the at least one transistor; and
    a sub-circuit configured to test a functionality of the power dissipation circuit by applying a test pulse signal to a gate of the at least one transistor, the sub-circuit comprising:
        a readout circuit comprising a readout circuit transistor and a first resistor connected between the at least one transistor and the resistor of the power dissipation circuit, and a second resistor and a diode, the readout circuit being configured to output a test response signal.

2. The clamp circuit according to claim 1, wherein sub-circuit further comprises an input terminal configured to receive an input signal for activating the sub-circuit; and
    a driver connected to the input terminal and configured to buffer the test pulse signal.

3. The clamp circuit according to claim 2, wherein the sub-circuit further comprises an output terminal configured to output the test response signal indicative of the viability of the power-dissipation circuit.

4. The clamp circuit according to claim 3, wherein the readout circuit is configured to indicate whether the at least one transistor or the resistor is damaged.

5. The clamp circuit according to claim 4, wherein the readout circuit is configured to output the test response signal at the output terminal of the sub-circuit.

6. The clamp circuit according to claim 5, wherein when the power dissipation circuit is functional then the clamp circuit is functional, and the test response signal is a same as the input signal, and it is determined that the clamp circuit is not functional when the test response signal is held close to ground.

7. The clamp circuit of claim 2, wherein the sub-circuit further comprises:
a third resistor connected with the driver and being configured to apply the test pulse signal to the gate of the at least one transistor.

8. The clamp circuit of claim 2, wherein:
the clamp circuit further comprising:
a first diode reversed biased and connected at an anode thereof to a biasing circuit of the power dissipation circuit, and configured to limit a voltage across the load by turning the at least one transistor on when the surge occurs, and a second diode at an input of the clamp circuit being connected to the first diode; and
the sub-circuit further comprising a third resistor connected with the driver and between the first diode and the second diode and configured to apply the test pulse signal to the gate of the at least one transistor, wherein upon buffering the test pulse signal by the driver, a low current pulse is applied at a cathode of the first diode, via the third resistor and the second diode, thereby creating a voltage greater than a voltage of the first diode to initiates a test of the functionality of the power dissipation circuit.

9. The clamp circuit according to claim 1, wherein the load is an avionics system.

10. A method for operating a clamp circuit configured to protect a load against a surge, the method comprising:
powering the clamp circuit including a power dissipation circuit including at least one transistor and a resistor;
dissipating power, via the power dissipation circuit, from the surge across the resistor and the at least one transistor by turning on the at least one transistor, wherein when the at least one transistor is turned on, a voltage divider is formed between a source impedance and the resistor of the power dissipation circuit disposed in series with a channel of the at least one transistor and the resistor holds a portion of transient pulse seen by the load to a low voltage and the low voltage is added to a threshold voltage of the at least one transistor;
enabling via a sub-circuit of the clamp circuit, a built-in test function of the clamp circuit by applying a test pulse signal to a gate of the at least one transistor, the test pulse signal being a digital signal, and asserting a digital response signal at an output terminal of the clamp circuit using a readout circuit including a readout circuit transistor, a first resistor connected between the at least one transistor and the resistor of the power dissipation circuit, and a second resistor and a diode; and
determining, in response to enabling the built-in test function, a status of the clamp circuit.

11. The method according to claim 10, wherein enabling the built-in test function includes asserting the digital signal at an input terminal of the clamp circuit.

12. The method according to claim 11, wherein the digital response signal at the output terminal is indicative of whether a power dissipation circuit included in the clamp circuit is functional.

13. The method according to claim 12, wherein when the power dissipation circuit is functional then the clamp circuit is functional, and the digital response signal at the output terminal is a same as the digital signal at the input terminal, and it is determined that the clamp circuit is not functional when the digital response signal at the output terminal is held close to ground.

14. The method according to claim 10, wherein the load is an avionics system.

15. The method according to claim 10, wherein the surge occurs in response to lightning.

16. A built-in test circuit to test the functionality of a clamp circuit comprising a power dissipation circuit including at least one transistor and a resistor, the built-in test circuit comprising:
an output terminal;
an input terminal configured to receive an input signal for activating the built-in test circuit and a test pulse signal, wherein the built-in test circuit is configured to apply the test pulse signal to a gate of the at least one transistor; and
a readout circuit comprising:
a first resistor connected between the at least one transistor and the resistor of the power dissipation circuit,
a readout circuit transistor connected to the first resistor, and
a second resistor and diode connected in series with the readout circuit transistor, wherein the diode is configured to output a test response signal at the output terminal, and when the clamp circuit is functional the test response signal is a replica of the test pulse signal.

* * * * *